US005988428A

United States Patent [19]

Lauer

[11] Patent Number: 5,988,428

[45] Date of Patent: Nov. 23, 1999

[54] VENDING MACHINE FOR CANS WITH DISPENSING ROD

[75] Inventor: Thomas Lauer, Chesterland, Ohio

[73] Assignee: Vendcraft Inc, Clevaland, Ohio

[21] Appl. No.: 08/739,022

[22] Filed: Oct. 28, 1996

[51] Int. Cl.[6] ...... B65G 59/06

[52] U.S. Cl. ...... 221/19; 221/266

[58] Field of Search ...... 221/18, 19, 152, 221/196, 262, 263, 266, 292, 293, 299

[56] References Cited

U.S. PATENT DOCUMENTS

| | | | |
|---|---|---|---|
| 1,999,887 | 10/1935 | Walker | 312/47 |
| 3,432,074 | 3/1969 | Brown | 221/117 |
| 4,860,922 | 8/1989 | Malservisi et al. | 221/6 |
| 5,397,025 | 3/1995 | Lee | 221/299 |

*Primary Examiner*—H. Grant Skaggs
*Assistant Examiner*—Kenneth W. Bower

[57] ABSTRACT

A vending machine for vending a plurality of cans includes a storage means for storing plurality of cans to be vended, an article dispensing rod which is both pivotable and moveable in a vertical direction to control the movement of cans from the storage means to a dispensing station. A coin mechanism is provided having an output shaft operatively connected to the dispensing rod to effect both vertical movement of the dispensing rod and pivotable movement thereof. The movement of the dispensing rod by the output shaft of the coin mechanism enables the dispensing rod to control the movement of cans from the storage means to the dispensing station where the cans can be received by a user of the vending machine. A lockout mechanism is provided to prevent actuation of the coin mechanism and the dispensing rod when there are no cans present to be vended in the can storage means.

13 Claims, 10 Drawing Sheets

VENDING MACHINE FOR CANS WITH DISPENSING ROD

DESCRIPTION—TECHNICAL FIELD

The present invention relates to a vending machine for vending articles and more particularly to a simple, low cost vending machine for sequentially vending cans such as canned soda. The vending machines includes a simple dispensing mechanism which includes a dispensing member which is preferably formed from a metal rod. The metal dispensing rod is operable to move in a reciprocating fashion to move cans from a can storage means to a dispensing station and to block further movement of cans from the storage means to the dispensing station.

BACKGROUND OF THE INVENTION

Vending machines are well known for vending articles such as canned soda. Many known prior art vending machines cost in the range $5,000 to $6,000 and include complicated and costly mechanisms for dispensing articles and for determining when a particular storage rack in the vending machine is empty.

The present invention overcomes the disadvantages associated with the prior art vending machines by providing a low-cost vending machine having a simple dispensing mechanism and means for sensing the absence of cans to be vended in the storage means and for locking the dispenser mechanism to prevent actuation thereof when there are no more cans to be vended in the can storage means.

SUMMARY OF THE INVENTION

The present invention provides a new and improved vending machine for vending a plurality of cans including a storage means, a can dispensing station, a dispensing mechanism for controlling movement of the cans from the storage means to the dispensing station and a coin mechanism having an output shaft which is rotatable when coins of a predetermined value are received therein. The dispensing mechanism includes a dispensing rod having a generally vertical portion disposed between a first generally horizontal end and a second end with the vertical portion of the dispensing rod including a can receiving portion and a can retaining portion. The horizontal end of the dispensing rod is connected to the output shaft of the coin mechanism and is movable through a generally circular path in response to rotation of the output shaft to effect a reciprocating movement of the dispensing rod in a generally vertical direction. The dispensing rod has a first position before the output shaft is rotated in which the can retaining portion of the dispensing rod is in engagement with the next can to be vended in the storage means to prevent movement of the next can to be vended. The dispensing rod moves in a vertical direction upon initial rotation of the output shaft to a second position in which the can receiving portion of the dispensing rod receives and supports for movement the next can to be dispensed from the storage means. Further rotation of the output shaft of the coin mechanism moves the dispensing rod to its first position to allow the can received in the can receiving portion of dispensing rod to drop therefrom to the article dispensing station while repositioning the can retaining portion of the dispensing rod in engagement with the next can to be dispensed in the storage means.

Still another provision of the present invention is to provide a vending machine for vending a plurality of cans including a storage means, a can dispensing station and an article dispensing member for controlling movement of the cans from the storage means to the can dispensing station. The storage means includes an output chute for directing cans from the storage means to the dispensing station which includes first and second substantially planner parallel side walls spaced apart a distance approximately equal to the distance between the pair of substantially planner end surfaces of the cans to be dispensed. The side walls are engageable with the associated end surfaces of a can to be dispensed to control the movement and orientation of the can to be dispensed as the can moves through the output chute. The dispensing member is operable to support the can to be dispensed for movement in a vertical direction between the side walls when it is desired to dispense a can from the storage means to the dispensing station and is operable to move the can from the storage means to a dispensing position in which one end surface of the can to be dispensed is moved out of engagement with its associated side wall of the output chute and the dispenser member engages and supports the cylindrical body of the can to be dispensed adjacent the other end of the can to allow the unbalanced can to fall from the dispenser member to the dispensing station under the influence of gravity.

DESCRIPTION OF THE PREFERRED EMBODIMENT

Figure 1:
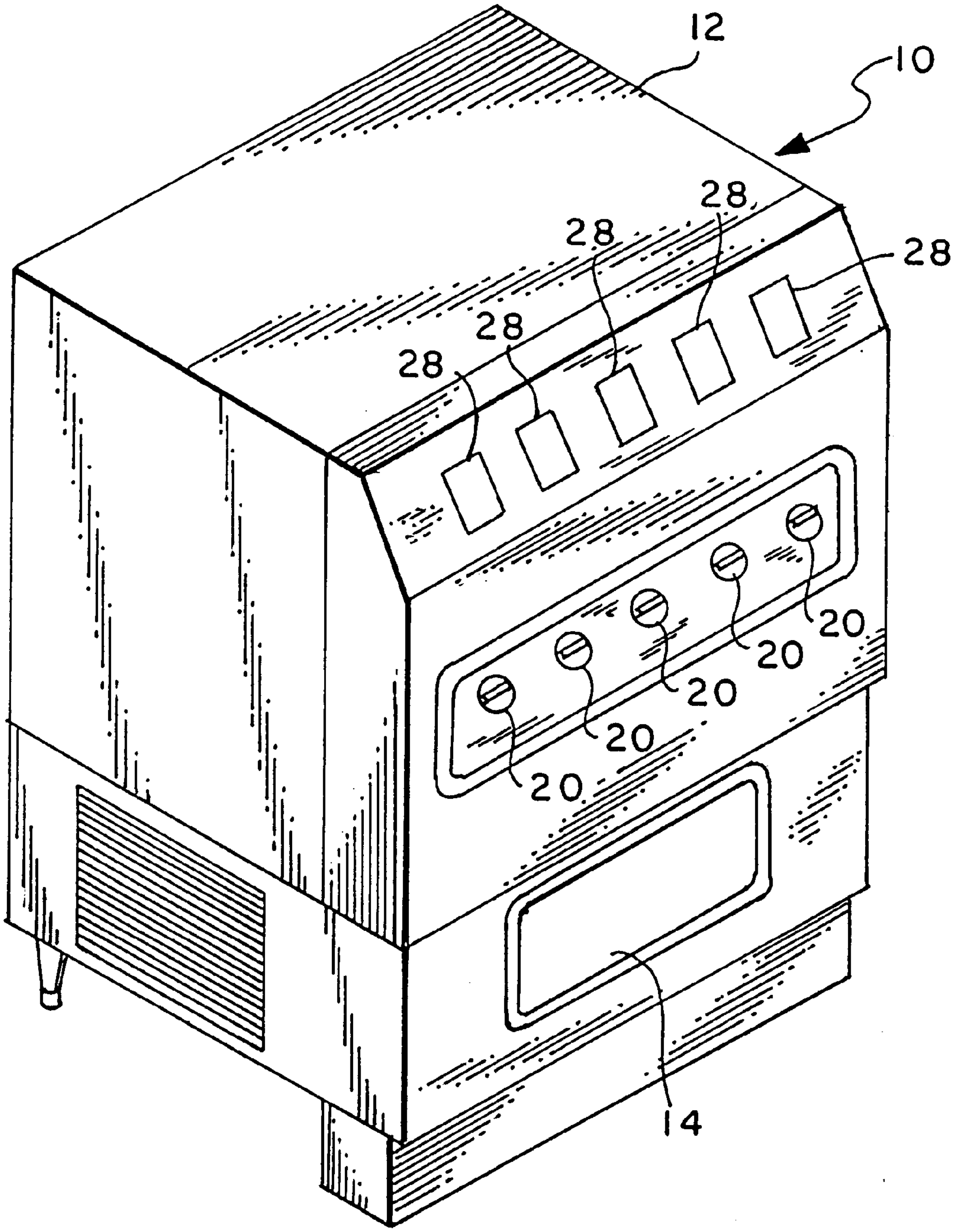
FIG. 1 is a perspective view of a vending machine constructed in accordance with the present invention.

Referring to the Figures, and more particularly to FIGS. 1, 2, 2*a* and 2*b*, a vending machine 10 constructed in accordance with the present invention is illustrated. The vending machine 10 is particularly designed to vend cans such as canned soda and includes a cabinet 12 having a can dispensing station 14 disposed therein. When a can 18 is vended, the can is moved to the can dispensing station 14 where the can 18 can be removed from the vending machine by a purchaser. A can storage means 16 for storing a plurality of cans 18 is disposed within the housing 12. A plurality of coin mechanisms 20 are located on the front of the cabinet 12, each of which is associated with a dispensing mechanism 22 for vending a can 18.

Figure 2:
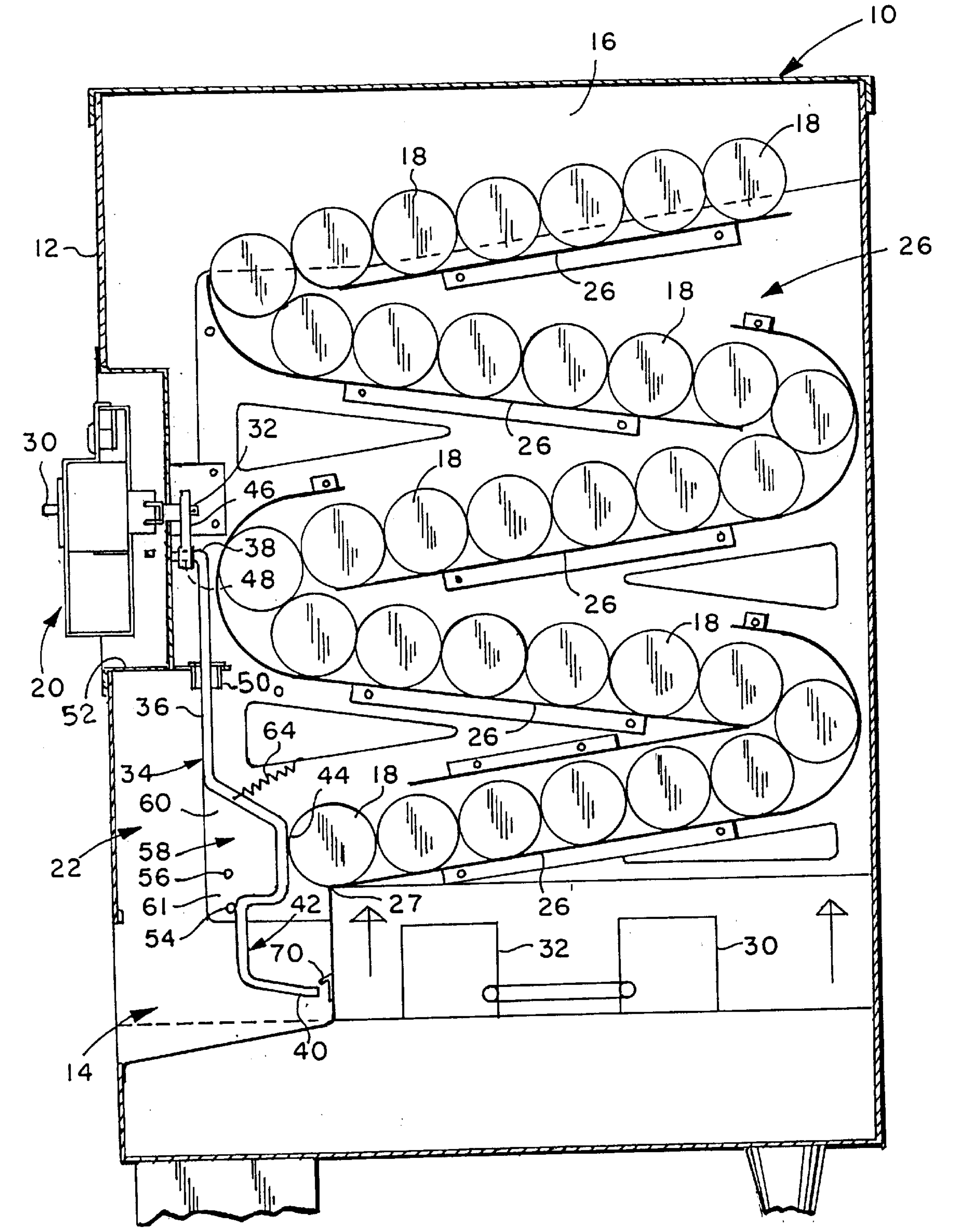
FIG. 2 is a side cross-sectional view of a vending machine constructed in accordance with the present invention, more fully illustrating the storage means, the dispensing station, the coin mechanism in its original position, and the can dispensing rod.
Figure 2B:
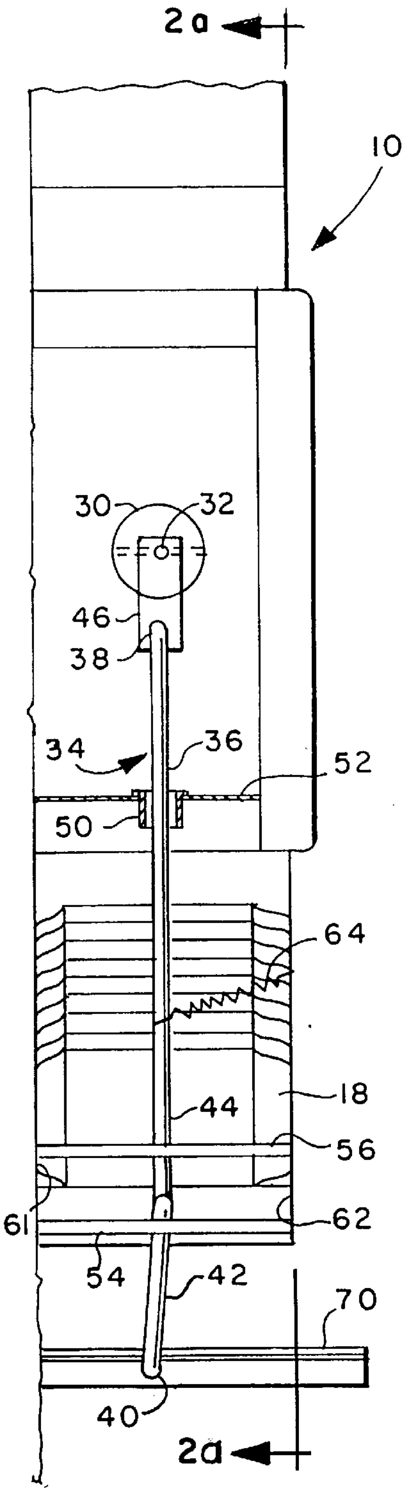
FIG. 2*b* is a fragmentary front view of the dispensing mechanism of FIG. 2*a* taken approximately along the lines 2*b*–2*b* illustrating the coin mechanism and dispensing rod in their position when the coin mechanism is at its initial position, ie. 0 degrees of rotation.
Figure 2A:
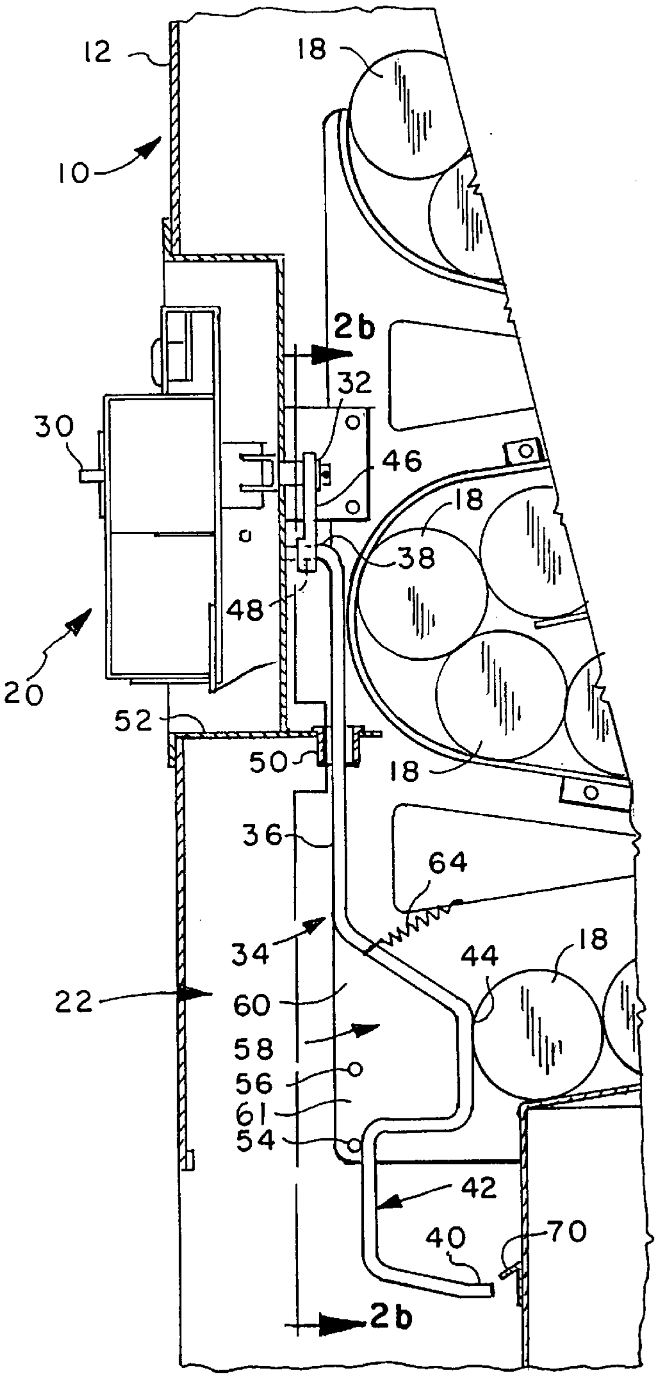
FIG. 2*a* is a partial crossectional view taken approximately along the lines 2*a*—2*a* of FIG. 2*b*, more fully illustrating the coin mechanism and dispensing rod in their initial or first position.

Each of the coin mechanisms 20 is associated with a storage rack 26, a plurality of which are located in the can storage means 16. Each of the storage racks 26, one of which is illustrated in FIGS. 2*a* and 2*b,* hold a plurality of a particular type of cans 18 to be vended. The storage racks 26 are of serpentine construction and the cans 18 stored therein sequentially move through the serpentine storage rack 26 by gravity as cans 18 are dispensed. Each of the can storage racks 26 includes an output chute 60 through which cans 18 are sequentially dispensed from the storage rack 26. Each of the output chutes 60 includes first and second side walls 61 and 62 which are spaced apart a distance slightly wider than the width of the cans 18 to be dispensed in a horizontal position. The side walls 60 and 62 are substantially planner and parallel to each other and each is adapted to engage with one end of the can 18 to positively orient and locate the cans 18 relative to the dispensing rod 34.

A plurality of designators 28 are disposed on the front of the housing 12, one of which is associated with each of the plurality of coin mechanisms 20 and each of the plurality of storage racks 26 located within the housing 12. The designators 28 designate the particular type of article 18 to be vended by its associated coin mechanism 20, dispensing mechanism 22, and storage rack 26. For example, different flavors of canned drinks, such as cola, grape, cherry, orange and lime, could be located in the designators 28 to indicate the particular flavor of canned soda which would be vended by each of the coin mechanisms 20 of the vending machine 10.

A compressor 30 and evaporator mechanism 32 can be disposed in the lower portion of the housing 12 to cool the cans 18 in a well-known manner. In addition, the lower portion 24 of the housing 12 can be used to store cans 18 to be vended to prechill the cans 18. This is particularly advantageous when the storage racks 26 are refilled with cans 18 and the cans have been prechilled in the lower portion of the housing 12 to insure that cans to be dispensed are always cold.

While the vending machine 10 includes a plurality of coin mechanisms 20, dispensing mechanisms 22, and can storage racks 26, only one of which will be fully described, it should be understood that all operate in a similar fashion.

Each of the coin mechanisms 20 is associated with a dispensing mechanism 22 for moving cans 18 from the associated can storage racks 26 to the dispensing station 14. Each of the coin mechanisms 20 is adapted to receive coins of a predetermined value therein which, when received in the coin mechanism, allows handle 30 of coin mechanism 20 to rotate to thereby rotates an output shaft 32 of the coin mechanism 20. The coin mechanisms can be one similar to that which is disclosed in U.S. Pat. No. 5,188,207 which is incorporated herein by reference. When coins of a predetermined value are received in the coin mechanism 20, the handle 30 of coin mechanism 20 can be rotated through 360 degree rotation, as is illustrated in FIGS. 2*b*–7*b,* to effect movement of a can 18 to be dispensed from the storage racks 26 to the dispensing station 14.

Figure 13:
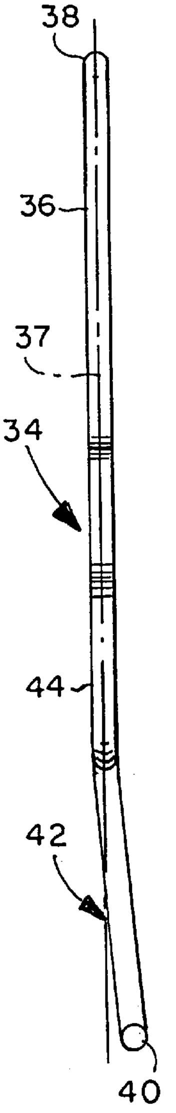
FIG. 13 is a side view taken approximately along the lines 13—13 of FIG. 12 more fully illustrating the dispenser rod.

Each of the coin mechanisms 20 is connected to the dispensing mechanism 22 which includes a dispensing rod 34 having a generally vertical portion 36 disposed between a first end 38 and a second end 40. The vertical portion 36 of dispensing rod 34 includes a generally C-shaped can receiving portion 42 and a can-retaining portion 44. The C-shaped can receiving portion 42 is adapted to receive a can 18 therein and control movement of the can 18 from the storage rack 26 to the dispensing station 14. The C-Shaped can receiving portion is preferable skewed approximately 5 degrees from the longitudinal axis 37 of the dispensing rod 36 as is illustrated in FIG. 13 to more fully control the movement of an article to be vended. The can-retaining portion 44 is adapted to engage with the next can 18 to be vended in the storage rack 26 to prevent movement of cans 18 from the storage rack 26 to the dispensing station 14. The dispensing rod 36 is preferably constructed from a solid metallic rod which is bent into the shape illustrated in the Figures. The elegant simplicity and low cost of the dispensing rod 36, which is easily formed from a 0.25" inch steel rod, significantly contributes to reducing the cost of the vending machine 10 from those known prior art vending machines.

The dispensing rod 36 is operatively connected to the coin mechanism 20. The output shaft 32 of the coin mechanism 20 includes a flange member 46 rigidly affixed thereto for rotation therewith. The flange member includes an opening 48 therein at one end thereof for rotatably receiving the first end 38 of the dispensing rod 34. The first end 38 of dispensing rod 34 has a substantially horizontal disposition as is viewed in the Figures and is disposed substantially at a right angle to the vertical portion 36 of dispensing rod 34. The horizontally disposed end portion 38 is rotatably received in the opening 48 disposed in the flange member 46 and rotation of output shaft 32 moves flange member 46 and the horizontal end portion 38 of dispensing rod 34 through a circular path which has its center defined by the output shaft 32 and a radius defined by the distance between the center of output shaft 32 and the center of opening 48 in flange 46. Movement of the first end 38 of dispensing rod 34 in a circular path effects a reciprocating movement of the vertical portion of the dispensing rod 34 in both a vertical direction and in a horizontal or pivoting direction.

The vertical portion 36 of the dispensing rod 34 extends through a bushing 50 supported on a planner member 52 on the rear of the coin mechanism 20. The bushing 50 cooperates with the dispensing rod 34 to affect a pivoting motion of the dispensing rod 34 when the dispensing rod reciprocates in a vertical direction due to movement of the first end portion 38 through a circular path by coin mechanism 20 as is more fully disclosed in the Figures.

FIGS. 2*a* and 2*b* illustrate the position of the dispensing rod 34 when the coin mechanism 20 is in its initial position before coins of a predetermined value are inserted in the coin mechanism. The handle 30 and operating shaft 32 are illustrated in their 0 degree position and the dispensing rod is illustrated in its first position in which the can retaining portion 44 of the dispensing rod 34 engages with the next can 18 to be vended in the storage rack 26 to prevent movement of cans 18 from the storage rack 26 to the dispensing station 14.

When the dispensing rod 34 is in its position illustrated in FIG. 2*a,* the weight of the cans 18 in the can storage rack 26 bias the dispensing rod 34 to the left as is illustrated in FIG. 2*a*. A pair of horizontal stop members 54 and 56, which can be formed from cylindrical stock are adapted to engage with the can receiving portion 42 of the dispensing rod 34 to limit movement of the dispensing rod 34 toward the left as viewed in FIG. 2*a* when the dispensing rod 34 is biased by the cans 18 in the can storage rack 26.

A spring 64 is connected to the vertical portion 36 of the dispensing rod 34 and the side wall 62 of the output chute 60 to bias the dispensing rod 34 to the right as viewed in FIG. 2*a* and into engagement with the next can 18 to be dispensed in storage rack 26.

Figure 3A:
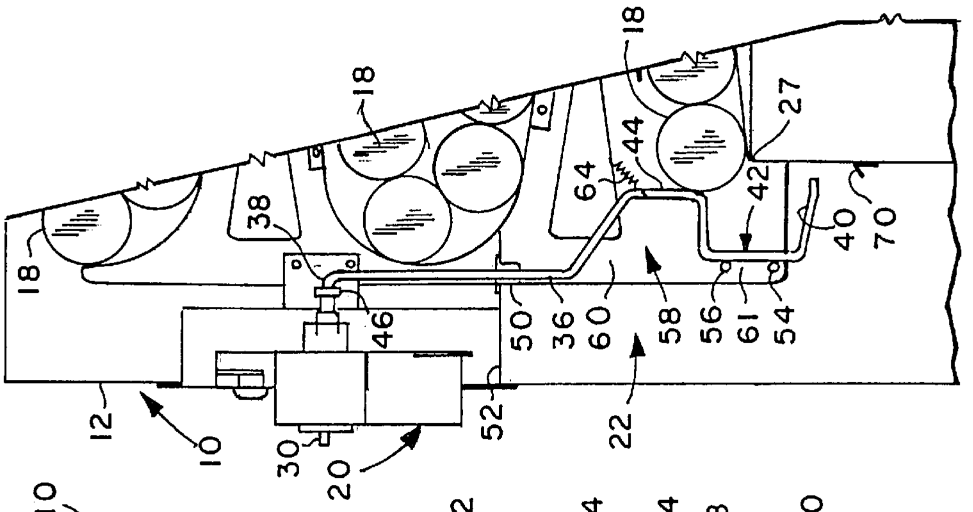
FIG. 3*a* is a fragmentary, partially cross-sectioned view more fully showing the dispensing rod moved to its position in which the coin mechanism is at 90 degrees rotation.
Figure 3B:
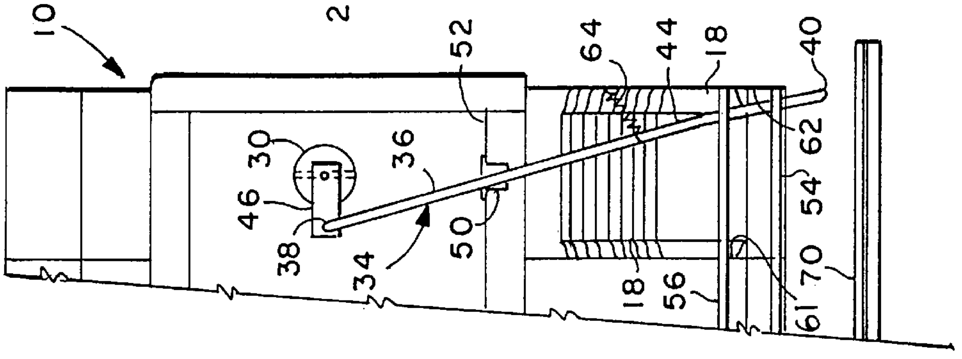
FIG. 3*b* is a front view of the dispensing mechanism in its position illustrated in FIG. 3*a*.

Rotation of knob 30 of the coin mechanism in a clockwise direction 90 degrees from its position illustrated in FIGS. 2*a* and 2*b* to its position illustrated in FIGS. 3*a* and 3*b,* effects rotation of output shaft 32 90 degrees to rotate the first end 38 of dispensing rod 34 a quarter of the way through the circular path through which the end 38 of the dispensing rod 34 is designed to move. Movement of the dispensing rod 34 to its position illustrated in FIGS. 3*a* and 3*b* effects a vertical upwards movement of the dispensing rod 34 and causes pivoting of the dispensing rod about bushing 50 to its position illustrated in FIG. 3*b*. In this position the can-retaining portion 44 of the dispensing rod 34 continues to engage the next can 18 to be vended to prevent movement of cans 18 from the storage rack 26.

Figure 4A:
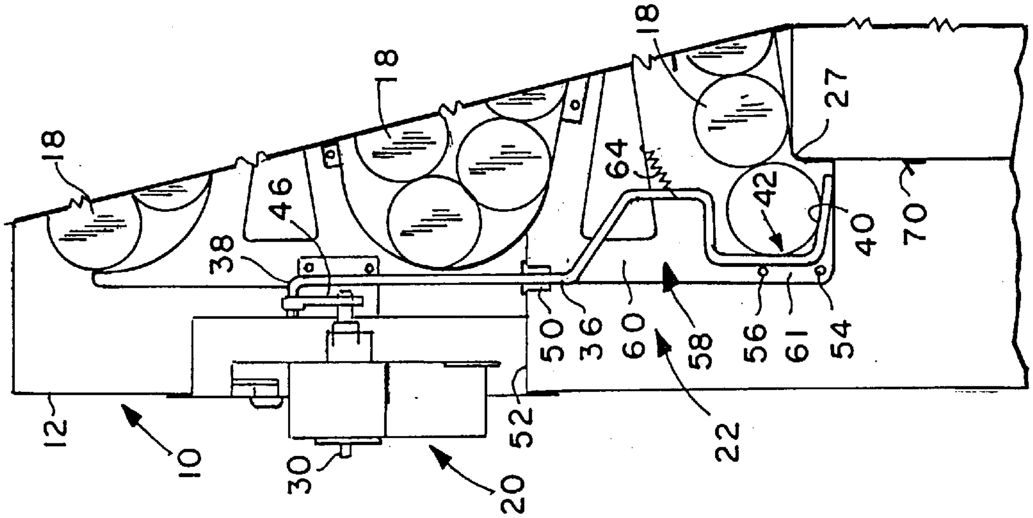
FIG. 4*a* is a view similar to FIG. 3*a* showing the coin mechanism at 160 degrees rotation and the dispensing rod moved to its second position in which the can receiving portion of the dispenser rod receives a can from the storage means.
Figure 4B:
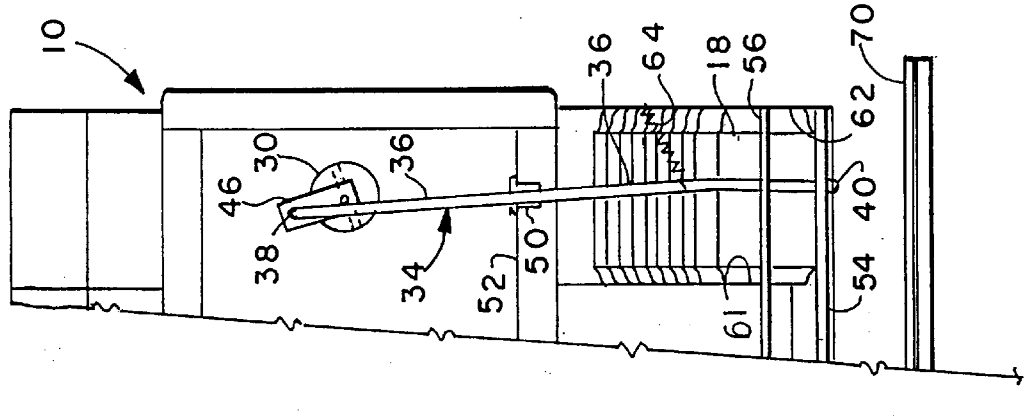
FIG. 4*b* is a front view of the dispensing mechanism in its position illustrated in FIG. 4*a*.

Further rotation of the knob of the coin mechanism 20 and output shaft 32 to approximately 160 degrees as is illustrated in FIGS. 4*a* and 4*b,* moves the dispensing rod to its second position to effect the release of the next can 18 to be dispensed from the storage rack 26 to the can receiving portion 42 of the dispensing rod 34. The second end 40 of the dispensing rod 34 cooperates with the sides 61 and 62 of the output chute 60 to support a can 18 in the can receiving portion 42 of the dispensing rod 34. In this position, the end 40 of the dispensing rod 34 is located substantially mid-way between the ends of the can 18 to thereby support the can essentially in the middle of the can. The side walls 61 and 62 of the output chute 60 cooperate with dispensing rod 34 to support can 18 in the can receiving portion 42 of the dispensing rod 34 by preventing horizontal movement of the can 18 relative to the dispensing rod 36 when the can is received in output chute 60.

Figure 5A:
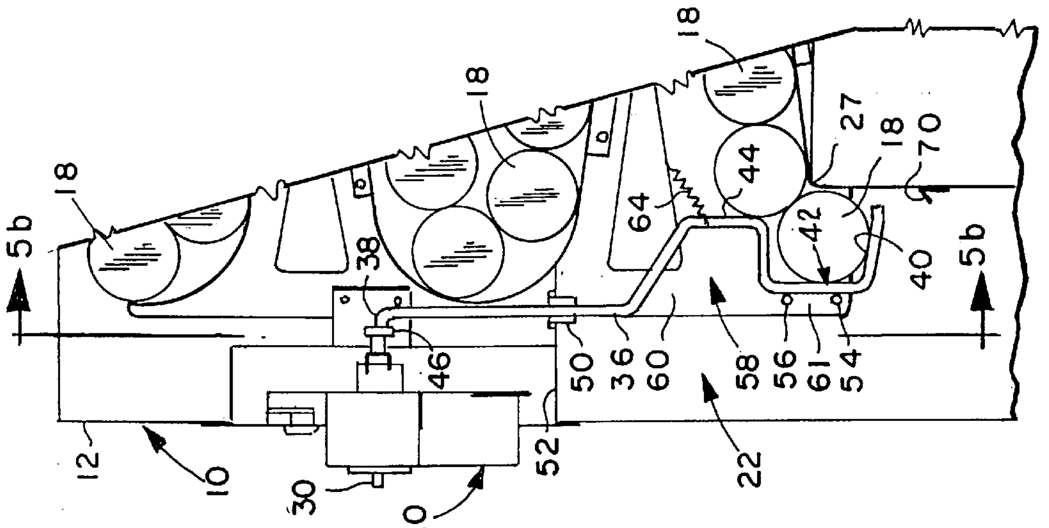
FIG. 5*a* is a view similar to FIG. 4*a* showing the coin mechanism at 270 degrees rotation as the dispensing rod moves in a downward direction from its position illustrated in FIG. 4*a*.
Figure 5B:
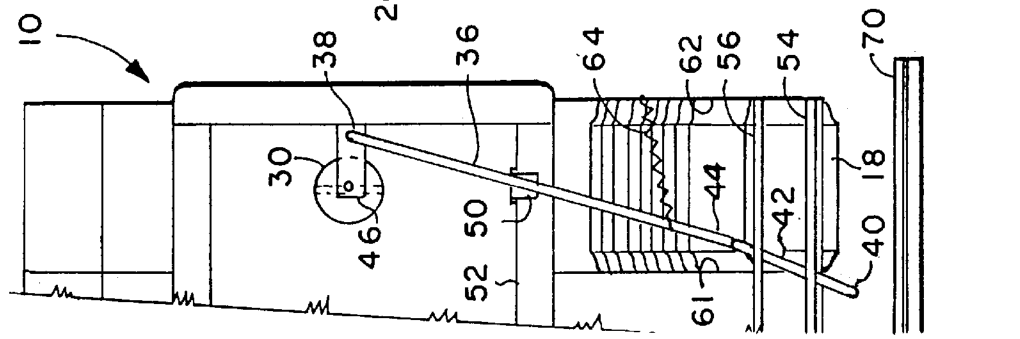
FIG. 5*b* is a front view of the dispensing mechanism in its position illustrated in FIG. 5*a*.

Further rotation of the output shaft 32 of the coin mechanism 20 to 270 degrees, to its position illustrated in FIGS. 5*a* and 5*b,* effects downward vertical movement of the dispensing rod 34 and further pivoting of the dispensing rod 34 about bushing 50. In this position, the end 40 of the dispensing rod supports the can to be vended in the can receiving portion of the dispensing rod 34 adjacent one end of the can 18. The ends of the can 18 are still engaged with the side walls 61 and 62 of the output chute 60 and prevent movement of the can 18 in a horizontal direction from the can receiving portion 42 of the dispensing rod 34.

Figure 6A:
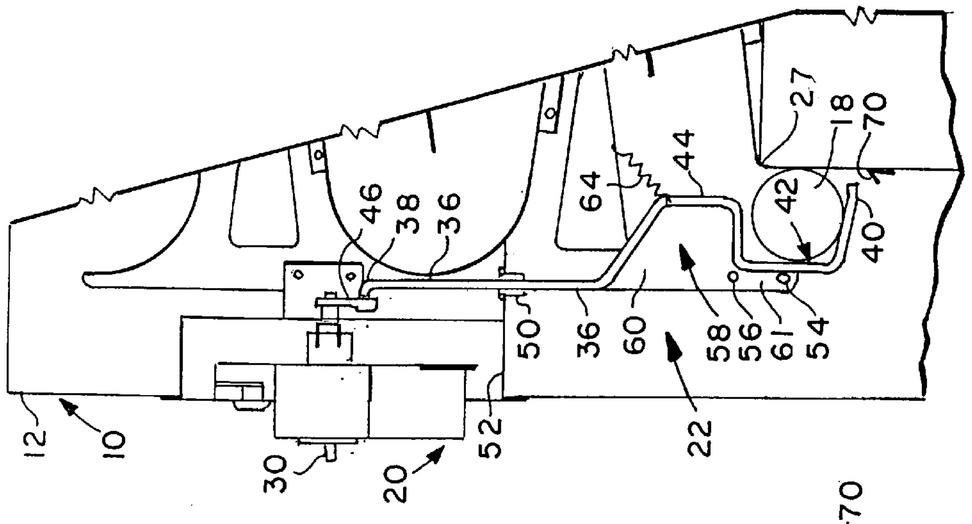
FIG. 6*a* is a view similar to FIG. 5*a* showing the coin mechanism at 320 degrees rotation and the dispensing rod in its position just prior to the dispensing rod moving to its first position.
Figure 6B:
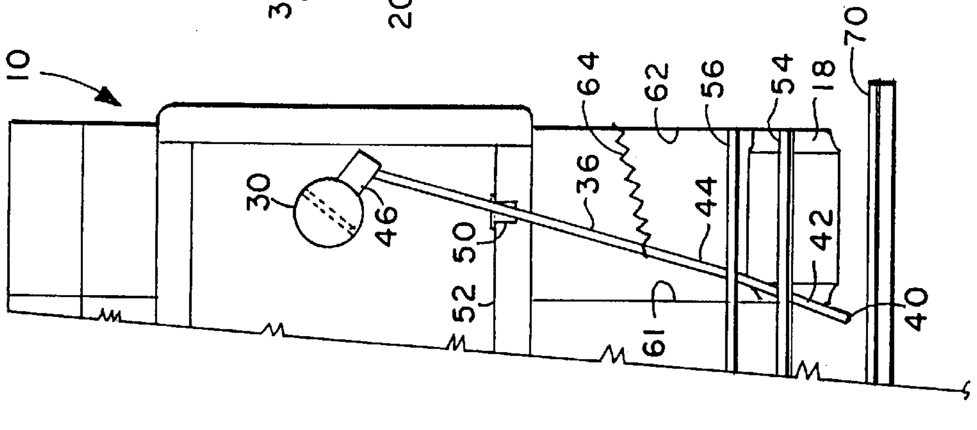
FIG. 6*b* is a front view of the dispensing mechanism in its position illustrated in FIG. 6*a*.

Rotation of the output shaft 32 of coin mechanism 20 to 320 degrees rotation as is illustrated in FIGS. 6*a* and 6*b* effects further downward movement of the dispensing rod 34 and movement to the left, as viewed in FIG. 6*b,* of the second end 40 of the dispensing rod 34 from its position illustrated in FIG. 5*b*. In this position the can 18 disposed in the can receiving portion 42 of the dispensing rod 34 is still supported adjacent one end of the can by the can receiving portion 42 of the dispensing rod and is still in engagement with the side walls 61 and 62.

Figure 7A:
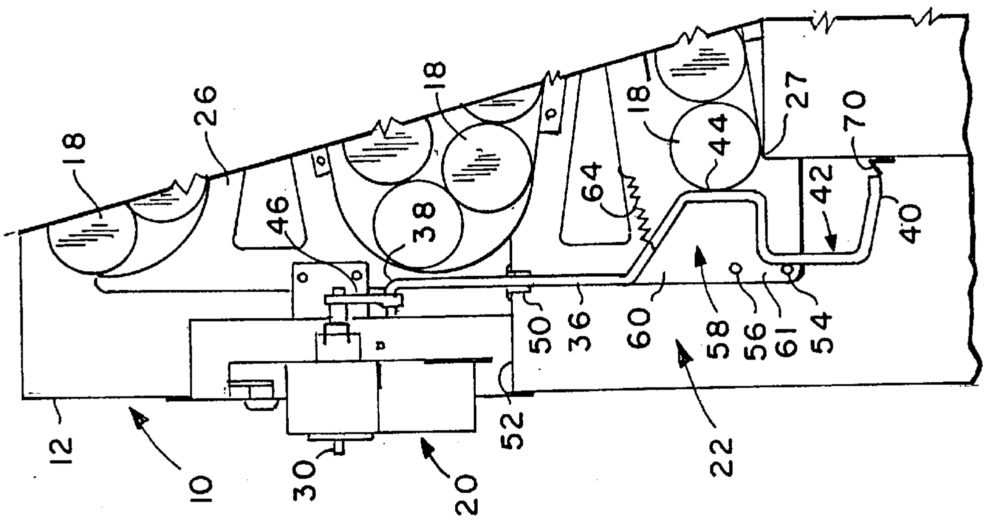
FIG. 7*a* is a view similar to FIG. 6 illustrating the coin mechanism at 325 degrees rotation the dispensing rod in its first position, and the can falling from the dispensing rod to the dispensing station.
Figure 7B:
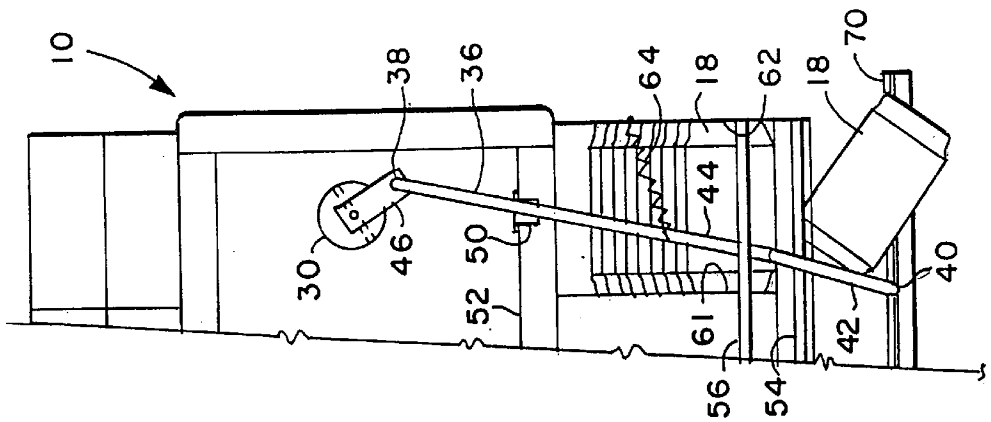
FIG. 7*b* is a front view of the dispensing mechanism of FIG. 7*a*.

Further rotation of the knob 30 of coin mechanism 20 in a clockwise direction to approximately 325 degrees of rotation effects further movement of the dispensing rod 34 to its position illustrated in FIGS. 7*a* and 7*b*. In this position, the dispensing position, the dispensing rod 34 moves in a downwardly direction from its position illustrated in FIG. 6*a* and the end of the can 18 moves from engagement with the side wall 62 which allows the unbalanced can to tilt and fall from the can receiving portion 42 of the dispensing rod 34 to the dispensing station 14. The skewing of the can receiving portion 42 of the dispensing rod 34 approximately 5 degrees from its longitudinal axis 37 controls the movement of the can and allows the can to tilt and fall from the can receiving portion 42 when the can is moved to its position illustrated in FIGS. 7*a* and 7*b*. In this position, the can-retaining portion 44 of the dispensing rod 34 is in engagement with the next can 18 to be vended in the storage rack 26 to prevent movement of cans 18 from the storage rack 26. Further rotation of the knob 30 of the coin mechanism to 360 degrees rotation causes further downward movement of the dispensing rod 34 to its first position illustrated in FIGS. 2*a* and 2*b*.

It should be appreciated that the movement of the end 38 of the dispensing rod 34 through a circular path by the output shaft 32 imparts both a horizontal and a vertical component of motion to the dispensing rod 34 as the end 38 travels through the circular path. The vertical component of motion affects vertical movement of the dispensing rod 34 and the horizontal component affects horizontal movement of the end 40 back and forth across the circular path. The bushing 50 engages the dispensing rod 34 on the vertical portion 36 thereof and causes the dispensing rod 34 to pivot back and forth due to the horizontal component of motion imparted to the end 38 of the dispensing rod 34. The pivoting movement of the dispensing rod causes the can receiving portion 42 of the dispensing rod 34 to oscillate in a horizontal direction as the operating shaft 32 rotates and reciprocates the dispensing rod 34 in a vertical direction. Both the horizontal component of motion and vertical component of motion are transmitted to the dispensing rod from the flange 46 as the output shaft 32 rotates and the dispensing rod 34 moves in both a vertical and horizontal direction as is illustrated in the Figures.

Figure 8:
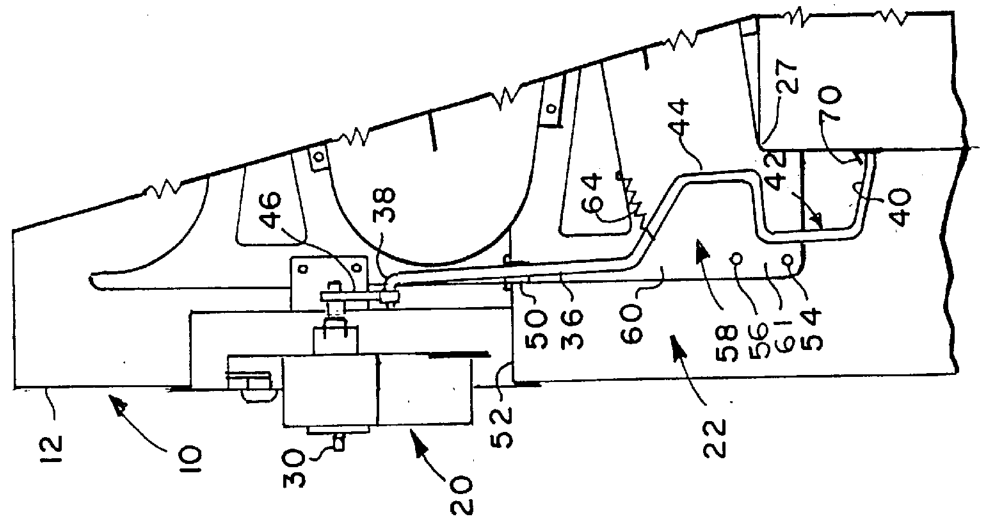
FIG. 8 is a view similar to FIG. 2*a* showing the coin mechanism at its 0 degree position and the biased dispenser rod engaging with the stop member to prevent further movement of the dispensing rod and the coin mechanism.

When the last can 18 is vended from the storage rack 26, cans 18 will no longer be present in storage rack 26 to bias dispensing rod 34 toward the left as viewed in FIG. 8. No cans will engage with the can-retaining portion 44 of the dispensing rod. Spring 64 will then bias dispensing rod 34 to the right to its position illustrated in FIG. 8 in which the end 40 of the dispensing rod engages with a stop member 70. Engagement of the end 40 of the dispensing rod 34 with stop member 70 prevents vertical movement of the dispensing rod 34 in an upward direction which in turn prevents rotation of handle 30 of the coin mechanism 20. Thus, when there are no cans present in the storage rack 26, the dispensing rod 34 will prevent the coin mechanism 20 from being actuated due to engagement of the second end 40 of the dispensing rod 34 with the stop member 70.

Figure 9:
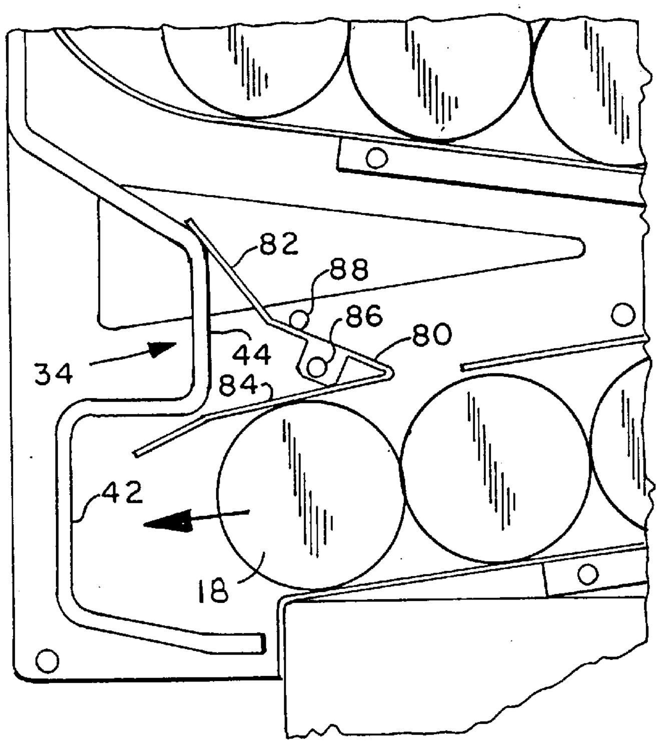
FIG. 9 is a view similar to FIG. 4*a* showing the coin mechanism at 160 degrees rotation, the dispensing rod moved to its second position in which the can receiving portion of the dispensing rod receives a can from the storage means and illustrates an alternative embodiment of the lockout mechanism which is operable to prevent further movement of the dispensing rod and the coin mechanism when the last can has been vended from the storage rack.
Figure 10:
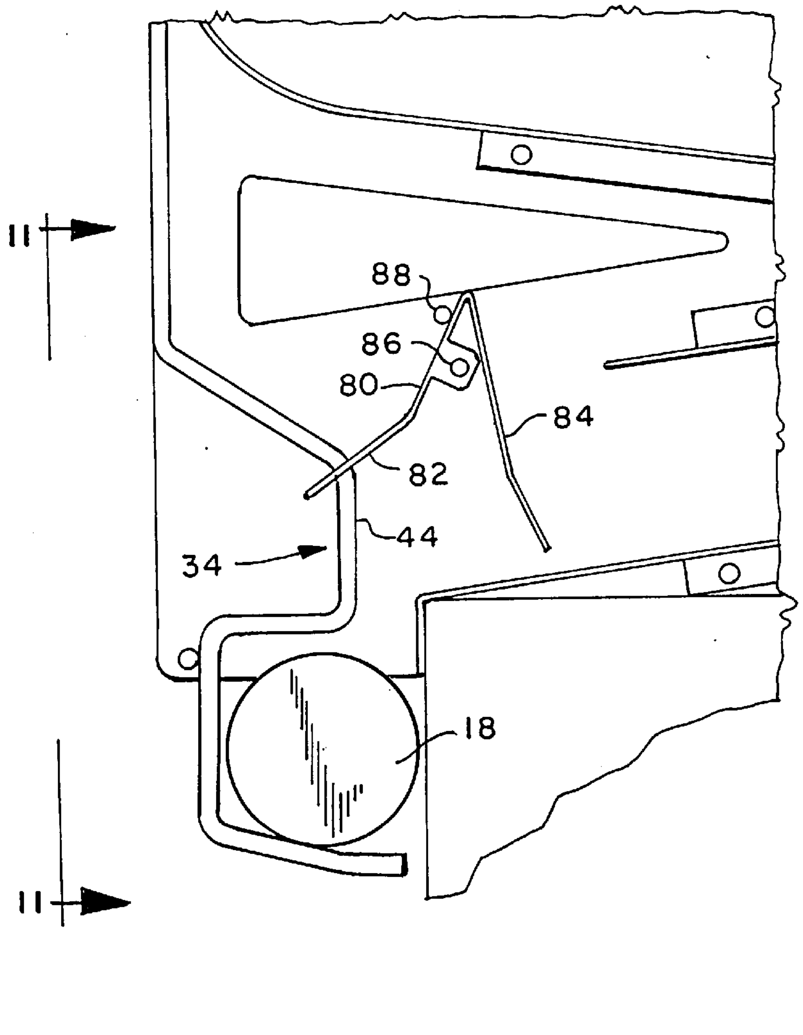
FIG. 10 is a view similar to FIG. 9 illustrating the lockout mechanism and the dispensing rod in their position in which the last can has been vended from the article storage means and the lockout mechanism moves to its lockout position.
Figure 11:
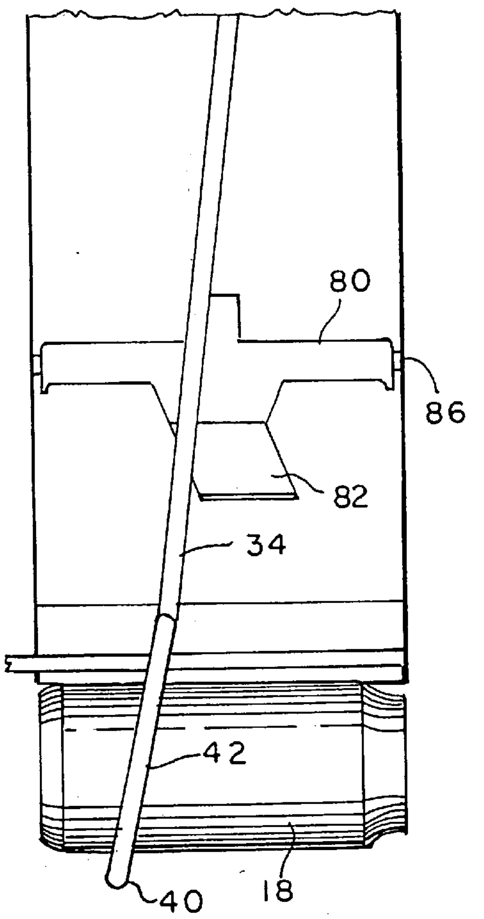
FIG. 11 is a front view of the lockout mechanism in its position illustrated in FIG. 10 taken approximately along lines 11—11 of FIG. 10 in which the lockout mechanism prevents further movement of the dispensing rod and rotation of the coin mechanism.
Figure 12:
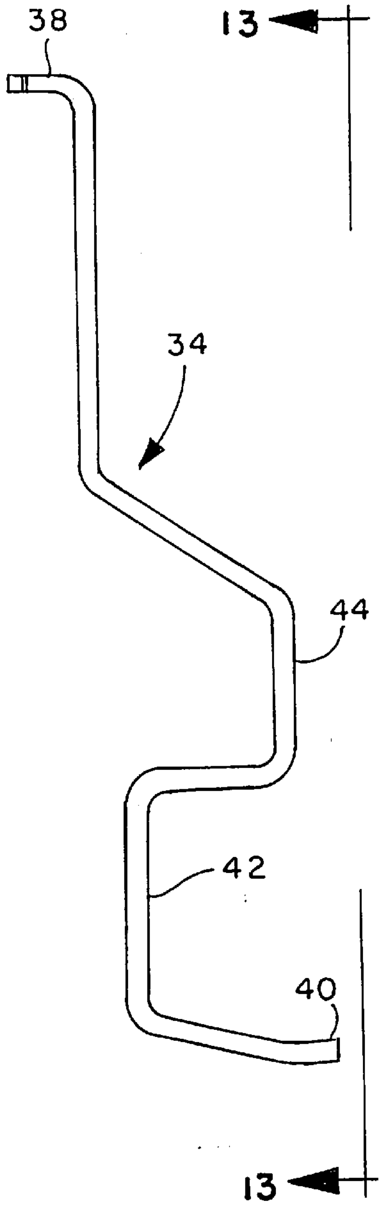
FIG. 12 is a side view more fully illustrating the dispensing rod.

An alternate mechanism for blocking the dispensing rod 34 to prevent the coin mechanism 20 from being actuated when no cans are present in the storage rack 26 is illustrated in FIGS. 9, 10 and 11. In this embodiment, the spring 64 and the stop member 70 can be eliminated and replaced with a lockout member 80. The lockout member 80 includes arms 82 and 84 which extend in a V-shaped configuration from the lockout member 80. The lockout member 80 is pivotable about a pivot point 86 and a stop member 88 is provided for limiting rotation of the lockout member 80 in a clockwise direction about the pivot point 86 as illustrated in FIG. 9. When cans 18 to be vended are present in the can storage rack 26, the next can to be vended engages with the lockout member 80 and rotate the lockout member 80 to its position illustrated in FIG. 9. In this position, the coin mechanism is rotated approximately 160 degrees and the can retaining portion 44 of the dispensing rod 36 engages arm 82 of the lockout member 80 and rotates the lockout member 80 to its position illustrated in FIG. 9 in which the next can 18 to be vended rolls unrestricted into the can receiving portion 42 of the dispensing rod 34. As the first can rolls into the can receiving portion 42 of the dispensing rod the next can in the can storage rack 26 rolls into engagement with arm 84 on lockout member 80 to hold the lockout member 80 in its position illustrated in FIG. 9 as the first can 18 is vended.

When the last can is vended and there are no more cans 18 in the can storage rack 26, the lockout member 80 rotates under the influence of gravity about the pivot point 86 to its position illustrated in FIGS. 10 and 11. The lockout member 80, when in its position illustrated in FIGS. 10 and 11, positions the arm 82 of lockout member 80 in the path of the dispensing rod 34. The arm 82 of lockout member 80 engages the can retaining portion 44 of the dispensing rod 34 to prevent the dispensing rod 34 from moving in a upward vertical direction. Engagement of the arm 82 with the dispensing rod 34 prevents vertical movement of the dispensing rod 34 which prevents rotation of the coin mechanism 20. The stop member 80 prevent the dispensing rod 34 and coin mechanism 20 from being moved to their 0 degree position to prevent coins from being inserted in the coin mechanism 20, i.e. as is well known, coins can only be inserted in the coin mechanism 20 when the coin mechanism 20 is in its 0 degree position. When the can storage rack 26 is reloaded with cans 18, the cans engage with the arm 84 of the lockout member 80 to return the lockout member 80 to its position shown in FIG. 9 which enable the dispensing rod 34 and coin mechanism 20 to again move to dispense cans. Thus, the lockout member 80 functions to prevent the coin mechanism 20 from receiving coins and the dispensing rod 34 from reciprocating when there are no cans in the storage rack 26.

From the foregoing it should be apparent that a new and improved vending machine 10 has been disclosed including a storage means 16 for storing a plurality of cans 18 to be vended, a coin mechanism 20 having an output shaft 32, a dispensing rod 34 operatively associated with the output shaft 32 and a dispensing station 14 wherein cans to be dispensed can be received by a user of the vending machine 10. Rotation of output shaft 32 causes both vertical movement of the dispensing rod and pivotal movement of the dispensing rod about the bushing 50. As the dispensing rod 34 moves in a vertical direction and in a pivotal direction due to rotation of output shaft 32 a can is moved under the weight of gravity from the storage rack 26 to the can receiving portion 42 of the dispensing rod. The can receiving portion 42 of the dispensing rod 34 cooperates with the side walls 61 and 62 of output chute 60 to support the can to be vended in the can receiving portion 42 of the dispensing rod as the can receiving portion oscillates in a horizontal direction and moves vertically in response to rotation of the output shaft 32. When the dispensing rod 34 moves to a position in which the can receiving portion 42 supports a can at one end thereof and at least one end of the can moves from engagement with one of the side walls 61 and 62 the can pivots and falls from the can receiving portion 42 of the dispensing rod to the dispensing station 14. A lockout mechanism is provided to prevent actuation of the coin mechanism 20 and dispensing rod 34 when there are no cans present to be vended in the can storage rack.

What I claim is:

1. A vending machine for vending a plurality of cans wherein each can has a generally cylindrical body and a pair of substantially planner end surfaces comprising a storage means for storing a plurality of cans to be vended, a can dispensing station from which cans can be dispensed, a dispensing mechanism for controlling movement of the cans from the storage means to the can dispensing station, and a coin mechanism having an output shaft which is rotatable when coins of a pre-determined value are received therein, said dispensing mechanism including a dispenser rod having a generally vertical portion disposed between a first generally horizontal end and a second end, said vertical portion of said dispensing rod including a can receiving portion and a can retaining portion, said first horizontal end of said dispensing rod being operatively connected to said output shaft of said coin mechanism and being movable through a generally circular path in response to rotation of said output shaft, said first end of said dispensing rod when moving through said circular path affecting a reciprocating movement of said dispensing rod in a generally vertical direction, said dispensing rod being located adjacent to said storage means and in engagement with the next can to be vended, said dispensing rod having a first position before said output shaft is rotated in which said can-retaining portion of said dispensing rod is in engagement with the next can to be vended in said storage means to prevent movement of said next can to be vended, said dispensing rod moving in a vertical direction upon initial rotation of said output shaft to a second position in which said can receiving portion of said dispensing rod receives and supports for movement in said storage means the next can to be dispensed from said storage means, said dispensing rod upon further rotation of said output shaft moving in a vertical direction to said first position in which one planner end surface of the can supported in said can retaining portion of said dispensing rod continues to engage said storage means and the other planner end surface of the can moves from engagement with the storage means to allow said can received in said can receiving portion of said dispensing rod to drop therefrom to said article dispensing station and to reposition said can-retaining portion of said dispensing rod in engagement with the next can to be dispensed in the storage means.

2. A vending machine for vending a plurality of cans as defined in claim 1 wherein said dispensing rod is biased by the weight of the cans to be vended in said storage means in a first direction and further including spring means for biasing said dispensing rod in a direction opposite said first direction to hold said dispensing rod in engagement with the next can to be dispensed in said storage means.

3. A vending machine for vending a plurality of cans as defined in claim 2 further including a stop member located adjacent to said second end of said dispensing rod, said spring means biasing second end of said dispensing rod into engagement with said stop member when no cans are present in said storage means to bias said dispensing rod in said first direction, said second end of said dispensing rod when engaged with said stop member preventing reciprocation of said dispensing rod to thereby prevent rotation of said output shaft of said coin mechanism.

4. A vending machine for vending a plurality of cans as defined in claim 2 further including a stop member located adjacent said dispensing rod, said spring means biasing said dispensing rod into engagement with said stop member when no cans are present in said storage means to bias said dispensing rod in said first direction, said dispensing rod when in engagement with said stop member preventing reciprocation of said dispensing rod and rotation of said output shaft of said coin mechanism.

5. A vending machine for vending a plurality of cans as defined in claim 1 where in said storage means includes a can storage rack for storing a plurality of can and an output chute through which cans are sequentially dispensed from said can storage rack, said output chute including first and second substantially planner, substantially parallel side walls, said first and second side wall being spaced apart a distance slightly larger than the height of the cans to be dispensed and wherein said first and second side walls are each engageable with an associated end surface of a can to be dispensed when the can is located in said can receiving portion of said dispensing rod and said dispensing rod moves from said second to said first position, said first and second side wall cooperating with said can receiving portion of said dispensing rod to in part control the movement and orientation of a can to be dispensed as the can moves through said output chute.

6. A vending machine for vending a plurality of cans as defined in claim 4 wherein said first and second side walls of said output chute cooperate with said dispensing rod when said dispensing rod moves from said second position to said first position with each of said side walls engaging one of said substantially planner end surfaces of the can to support a can in the can receiving portion of said dispensing rod, and wherein when said dispensing rod moves from said second to said first position with a can to be dispensed, supported in the can receiving portion of the dispensing rod, one of the planner end surfaces of the can moves from engagement with one of said side walls of said chute while the other planner end surface of the can remains in contact with the other side wall of said chute to enable the can to pivot and fall from the can receiving portion of the dispensing rod to the can dispensing station.

7. A vending machine for vending a plurality of cans as defined in claim 6 wherein said dispensing rod pivots when reciprocated in a vertical direction upon rotation of said output shaft, said dispensing rod pivoting from a vertical position in which said dispensing rod is generally vertically disposed, a can is received in said can-receiving portion of said dispensing rod, and said dispensing rod engages and in part supports the can at a position which is generally mid-way between the ends of the can to a pivoted position in which said dispensing rod is disposed at an acute angle from its vertical position and said can receiving portion supports the can at a position which is adjacent one end of the can to thereby enable the can to fall from the can receiving portion of the dispensing rod.

8. A vending machine for vending a plurality of cans as defined in claim 7 wherein said dispensing rod when in said pivoted position supports a can to be vended in the can receiving portion of the dispensing rod adjacent one end of the can and wherein the opposite end of the can passes from engagement with said side walls of said output chute when said dispensing rod moves toward said first position.

9. A vending machine for vending a plurality of cans as defined in claim 6 wherein said can falls to said can dispensing station from said can receiving portion of said dispensing rod prior to said dispensing rod reaching said first position when said dispensing rod moves from said second to said first position.

10. A vending machine for vending a plurality of cans as defined in claim 1 where in said can receiving portion of said dispensing rod has a generally C-shaped configuration.

11. A vending machine for vending a plurality of cans as defined in claim 1 further including a lockout member for preventing coins from being received in said coin mechanism and preventing rotation of said coin mechanism and movement of said dispensing rod when cans to be vended are not present in said storage means.

12. A vending machine for vending a plurality of cans as defined in claim 11 wherein said lockout member is engageable with the next can to be vended to position the lockout member in a first position when cans to be vended are located in said storage means and wherein said lockout member moves to a second position when a can to be vended is not located in said storage means, said lockout member when in said second position engaging said dispensing rod to limit movement thereof and preventing movement of said coin mechanism to a position in which said coin mechanism is operable to receive coins therein to thereby prevent said coin mechanism and dispensing rod from being actuated.

13. A vending machine for vending a plurality of cans as defined in claim 12 wherein said lockout member is pivotable between said first and second positions and includes a first arm for engaging with cans to be vended in said storage means and a second arm for engaging with and preventing movement of said dispensing rod when cans to be vended are not present in said storage means.

* * * * *